Figures 1, 3:
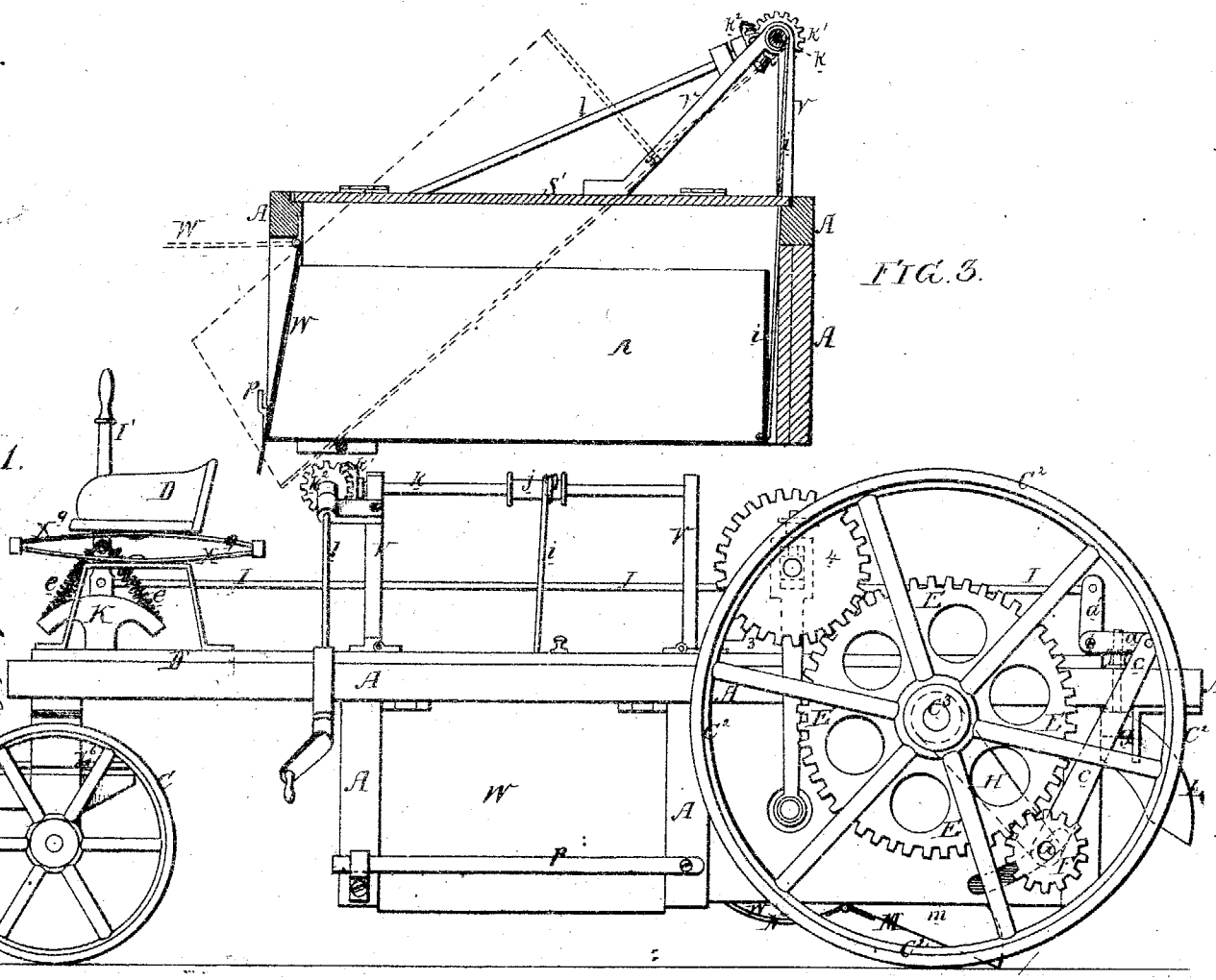

2 Sheets--Sheet 1.

R. A. SMITH, dec'd.

R. H. SMITH, Adm'r.

Street-Sweeping Machines.

No. 6,153. Reissued Nov. 24, 1874.

Witnesses,
Harry Smith
Thomas M. Sloan

R. A. Smith dec'd
R. H. Smith Administrator
and John L. Hill
by their Attys.
Wooster and Son.

2 Sheets--Sheet 2.
R. A. SMITH, dec'd.
R. H. SMITH, Adm'r.
Street-Sweeping Machines.
No. 6,153. Reissued Nov. 24, 1874.
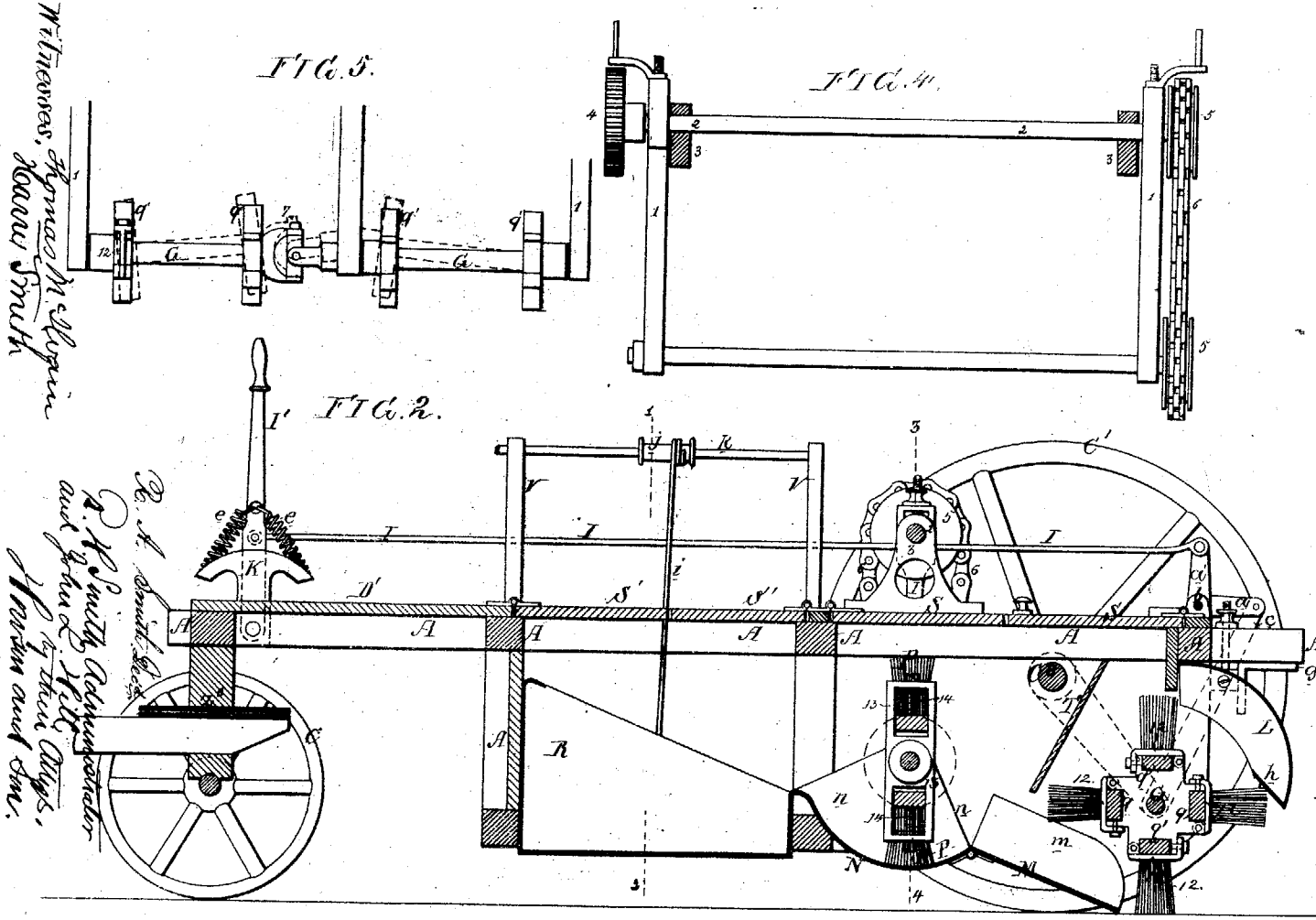
Witnesses, Thomas McIlvain
Harry Smith
R. A. Smith Dec'd.
R. H. Smith Administrator
and John L. Hill
by their Attys.
Howson and Son.

UNITED STATES PATENT OFFICE.

ROBERT H. SMITH, OF PHILADELPHIA, PENNSYLVANIA, (ADMINISTRATOR OF ROBERT A. SMITH, DECEASED,) ASSIGNOR OF ONE-HALF INTEREST TO JOHN L. HILL, OF SAME PLACE.

IMPROVEMENT IN STREET-SWEEPING MACHINES.

Specification forming part of Letters Patent No. 27,839, dated April 10, 1860; extended seven years; reissue No. 6,153, dated November 24, 1874; application filed May 6, 1874.

*To all whom it may concern:*

Be it known that ROBERT A. SMITH, deceased, late of the city, county, and State of New York, did invent a Machine for Sweeping Streets, of which the following is a specification:

The invention relates to machines for sweeping streets; and the objects of the invention are, first, to gather the dirt into a suitable receptacle, from which it may be discharged at intervals, and at suitable places of deposit along the street being swept, or into a tributary street where it will be out of the way until it can be finally carted off; second, to thoroughly clean the streets without creating a dust adjacent to the machine, however dry the dirt may be, and to thus avoid the necessity of sprinkling the streets preparatory to sweeping; and third, to render the brooms self-accommodating to the inequalities or grade of the street over which they are drawn, and at the same time to permit the said brooms to be raised or lowered by the driver as occasion may require.

These objects are attained by constructing the machine as will now be described, reference being had to the accompanying drawing, in which—

Figure 1 represents a side elevation of the complete machine, showing the several parts in their proper relative positions for sweeping; Fig. 2, a longitudinal vertical section of Fig. 1; Fig. 3, a transverse vertical section on the line 1 2, Fig. 2, through the center of the dirt-receiving box, showing said box in two positions—one for receiving the dirt, and the other for discharging it from the machine; Fig. 4, a transverse section on the line 3 4, Fig. 2, illustrating the hanging gear for the supplemental broom-shaft; and Fig. 5, a detached view of the main broom-shaft, made in sections, connected by a universal joint, as hereafter described.

A A represent the main framing of the machine, covered closely at the top with trap-doors. The whole is mounted on wheels C, C, $C^1$, and $C^2$, the latter being the driving-wheel for the broom shafts or cylinders. The front axle is attached to the body of the machine by a fifth wheel, $Z^6$, and the running-gear is so arranged that the machine may be turned short around. D is the driver's seat, mounted on springs $X^9$, which rest on standards secured to the platform D′. E is a large toothed wheel, secured to and turning with the driving-wheel $C^2$, and gearing into a pinion, F, Fig. 1. This pinion is keyed to the main brush-shaft G, which shaft has its bearings in two swinging arms, H H, the latter being loosely suspended from the axle $C^3$ of the driving-wheel, so as to describe an arc concentric with the axis of the said wheel. The free ends of these arms H are connected to the arms *a a* of a shaft, *b*, by rods *c c*, the inclination of which is determined by the position of the brooms. The shaft *b* extends transversely across and has its bearings on the top of the machine. At right angles to the arms *a*, on the right-hand side of the machine, is an arm, *a*′, secured to the shaft *b*, and to the end of this arm *a*′ is pivoted one end of a rod, I, connected at its opposite end to a hand-lever, I′, which is situated in a position to be conveniently operated by the driver from his seat D. The main broom-shaft G, suspended from the axle of the machine by the swinging arms H, in the manner above described, will be self-accommodating to the inequalities of the street-surface over which it is drawn, and the said shaft, through the mediums of the connections above described, can also be raised or lowered by the driver as occasion may require, while the machine is in motion. Two springs, *e e*, connected to the opposite sides of the hand-lever I′, and to the wings of a segmental guide-plate, K, serve to hold the brooms down firmly to their work, as they act upon the brooms through the medium of the hand-lever I′, connecting-rod I, arms *a*′ and *a a*, rods *c c*, and vibrating arms H H.

For very heavy work it will be necessary to press the brooms against the surface of the street with a greater degree of pressure than can be attained by the springs, and for effecting this object the lever I′ may be turned back and held by any suitable means. The brooms may also be elevated by the lever I′ at the option of the driver, and retained in an elevated position by simply moving the lever forward and holding it, or fixing it to the side of the seat or to the quadrant K.

At the rear of the main broom-cylinder, and extending well over the brooms, is a swinging box or trap, L, (shown clearly in Figs. 1 and 2,) which has its bearings in adjustable boxes *g g*, in brackets suspended from projecting beams A A of the frame of the machine. This trap has a receiver, *h*, at its lower end, for holding the dirt which escapes from the brooms, and the sides of the trap are closed in, so that dust cannot escape at these points, while the curved plate or cover of the trap fits tightly against the cross-bar A, and thus prevents escape of dust at the top.

The trap thus constructed and arranged catches the dust thrown up by the brooms and prevents its escape from the rear of the machine, and is an important feature of my invention. When the receiver *h* has been filled, it may be emptied by simply raising the trap.

M, Fig. 2, represents an inclined plate having sides *m*, and hinged to a curved plate, N, the curve of which is concentric with the circle described by the secondary brooms P. This latter plate is also provided with side plates *n*, which, like the plates *m* of the inclined plate M, prevent the dirt from escaping from the sides of the machine. The mouth of the inclined plate M rests on the ground, and is arranged in front of the main brooms, so as to receive the dirt swept up by the latter and conduct it to the pan or trough N, from which it is rapidly discharged by the secondary brooms P into a box, R, where it accumulates, and from which it may be discharged at suitable times, as will be hereinafter described.

The main and secondary brooms, with the conducting-plates and the general receiving-box R, are all closely housed in, as represented by the drawings, and on the top of the frame of the machine are hinged covers S S for the broom-compartment, and covers S′ S′ for the receiving-box R. Between the front and rear brooms is placed an inclined guard-board, T, extending across the machine, and of a sufficient width to prevent the dust and dirt thrown off by the secondary brooms P from falling on the main brooms, the said guard-board conducting the dirt back to the pan N.

In Fig. 3 the general receiving-box R is more clearly shown, in connection with the manner of operating it, so as to give it the proper inclination for dumping its load at the side of the machine. The box is suitably hinged at one side to the frame A, its opposite being free to move up or down, and being connected to a cord or chain, *i*, which passes over a flanged drum, *j*, on the pulley-shaft *k*. This pulley-shaft is mounted in brackets V V, and the chain *i* is wound up on the drum by beveled wheels $k^1$ and $k^2$, the latter being keyed to the end of an inclined crank-shaft, *l*, which passes down through the opposite side of the machine, near to the discharge-opening of the box R. By winding up the chain, the box will be inclined, and the covers S′ S′ having been previously opened, the guard W will be raised by the end of the box, as it is hinged to the frame A. This hinged guard W should be secured when closed by a bar, *p*, Figs. 1 and 3.

Any suitable tackle or gearing for operating the receiving-box R may be substituted for that above described.

The secondary broom-shaft P is hung in arms 1 1, rendered adjustable on a driving-shaft, 2, which has its bearings in brackets 3 3 on the top of the machine. This shaft is driven by a pinion, 4, from the driving gear-wheel E, and transmits motion to the broom-shaft through the medium of pulleys 5 5 and and an endless chain, 6. (See Figs. 2 and 4.) The use of the chain 6 and adjustable arms 1 1 for this special purpose is important, for there will be a constant wear of the parts, and consequent loosening of the same, and this gearing permits the slack to be taken up, when necessary.

It is known that it is old to tighten driving-belts by adjusting the bearings of their shafts; but it is only the special application of such adjustment that is claimed.

Fig. 5 shows the manner of constructing the main broom-shaft for machines in which it is necessary to adjust the brooms to inclined positions, for sweeping very narrow streets with a convex surface. The said shaft is made in two sections, connected together by a universal joint, 7, so that the sections may yield, and permit the brooms to be more or less inclined, as required.

If desired, the shaft may be positively adjusted to the required angle by means of a hanger, 8, secured to the said shaft adjacent to the joint.

The broom-heads 9 are secured to the main shaft as follows: Plates 9′ are secured to the shaft, as shown in Fig. 2, and into recesses in these plates are fitted the broom-heads 9, and retained therein by clamps 12 hinged to the plates at one side of each recess and arranged to be drawn over and secured to the opposite side or lip of the plate by screws, or in any other suitable way. By this simple contrivance the broom-heads can be readily secured in place and removed with the same facility. The secondary broom-heads P are set in adjustable bearing-plates 13, and adjusted as they wear by screws 14. (Shown in Fig. 2.)

The supplemental broom P and its connections, together with the pan N, are not absolutely essential to the successful operation of the machine, and may in some instances be dispensed with.

The following is claimed as new:

1. The main broom-shaft G, suspended from the axle $c^3$ by swinging arms H H, in combination with springs *e e*, arranged to act upon the said shaft, substantially as and for the purpose described.

2. In combination with the main broom-shaft, hung as set forth, the rods *c*, arms *a a'*, shaft *b*, and rod I, connecting with the lever I', for the purpose of enabling the driver to raise this broom-shaft at pleasure, as set forth.

3. The broom-shaft G, constructed in sections, connected by a universal joint, substantially as set forth.

4. The combination of the adjustable hangers 1 1, chain and chain-pulleys 5 5, the broom-shaft P, and the pan N, the whole being constructed and arranged in respect to each other, substantially as and for the purpose described.

5. The adjustable swinging box or trap L, and its receiver *h*, suspended over and at the rear of the main brooms, for the purpose specified.

6. The combination of the self-accommodating brush G, suspended from the axle by independent swinging arms H H, a receptacle, R, and a plate, M, for conducting the dirt toward the receptacle, suspended so that its outer edge is maintained in contact with the ground and below the brush, whatever may be the position of the latter.

In testimony whereof we have signed our names to this specification in the presence of two subscribing witnesses.

R. H. SMITH, *Administrator.*

JOHN L. HILL.

Witnesses:
WM. A. STEEL,
HARRY SMITH.